Nov. 28, 1933.　　　G. J. BLUM　　　1,936,617
DRIVE MECHANISM FOR A FLUID SUPPLY SYSTEM OR THE LIKE
Filed May 14, 1931　　2 Sheets-Sheet 1
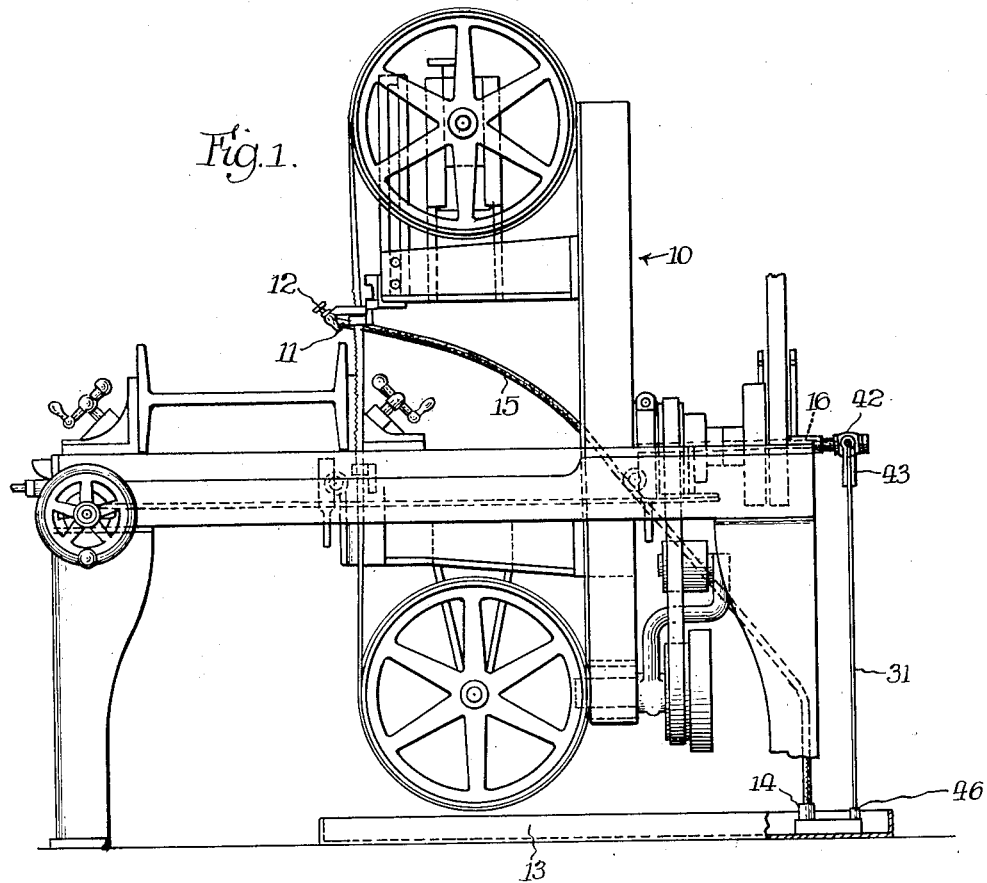
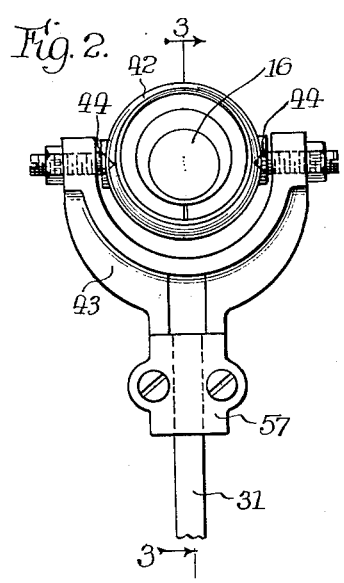
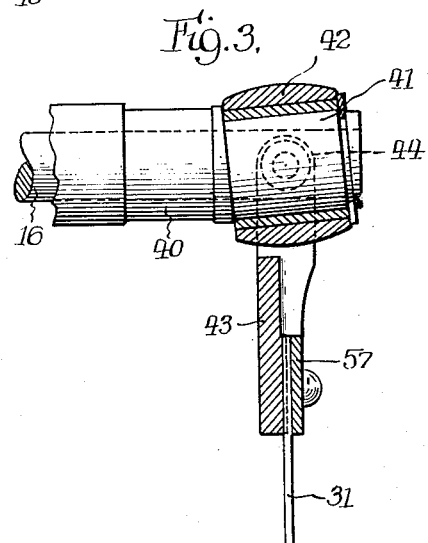
Inventor:
George J. Blum, Nov. 28, 1933.  G. J. BLUM  1,936,617
DRIVE MECHANISM FOR A FLUID SUPPLY SYSTEM OR THE LIKE
Filed May 14, 1931   2 Sheets-Sheet 2
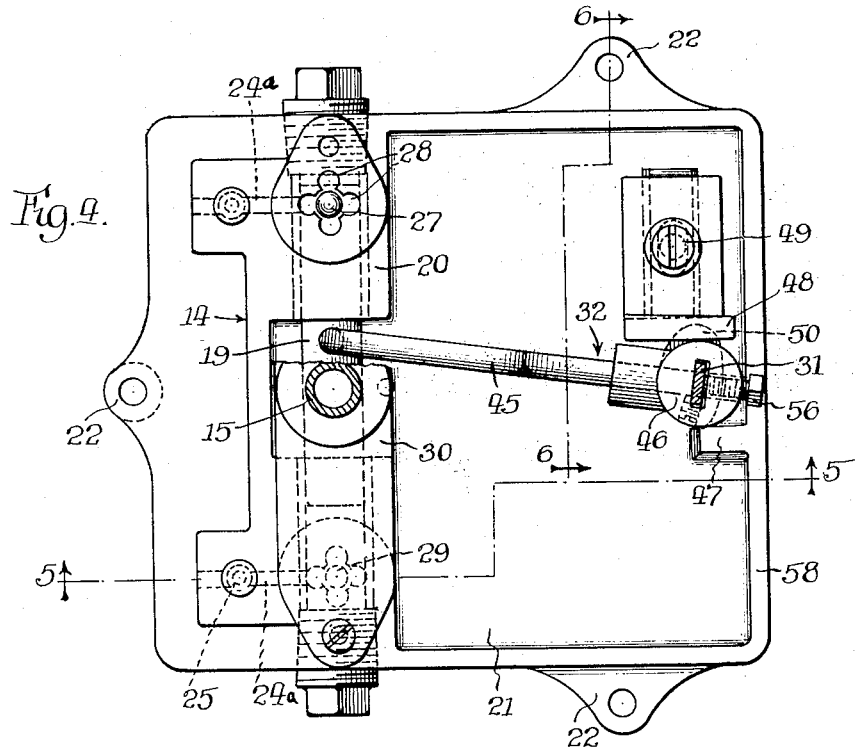
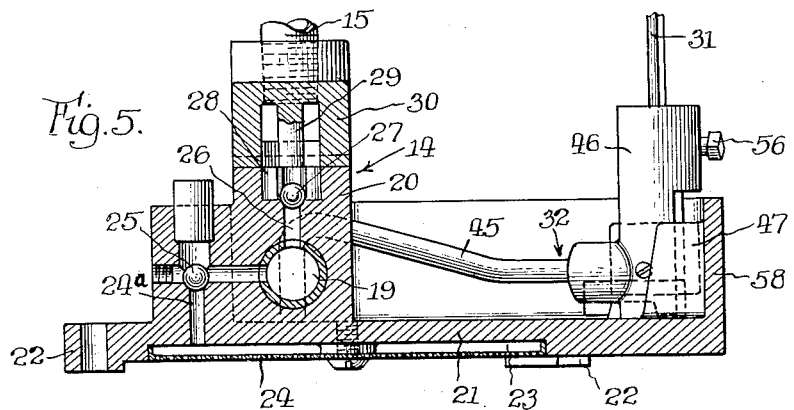
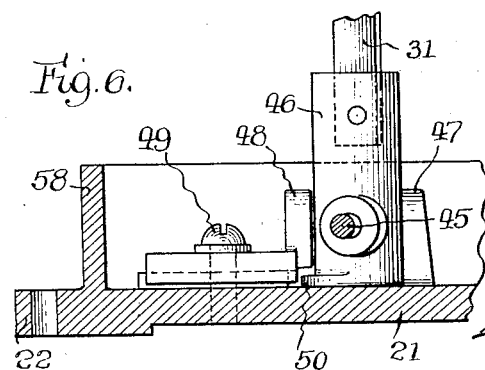
Inventor:
George J. Blum Patented Nov. 28, 1933

1,936,617

UNITED STATES PATENT OFFICE 1,936,617

DRIVE MECHANISM FOR A FLUID SUPPLY SYSTEM OR THE LIKE

George J. Blum, Chicago, Ill., assignor to Armstrong-Blum Mfg. Co., Chicago, Ill., a corporation of Illinois Application May 14, 1931. Serial No. 537,368

10 Claims. (Cl. 103—38)

The invention relates to a drive mechanism for a fluid supply system or the like, such as a coolant supply system for machine tools, and has for its primary object the provision of a drive mechanism for a system of this character, which permits the output of the system to be varied automatically in accordance with the flow of coolant permitted at the discharge nozzle, and which is simple and inexpensive in construction.

More specifically, the object is to provide a drive mechanism for a system of this character having a novel driving connection responsive to the pressure at the delivery nozzle to vary the output of the pump.

Other objects and advantages will become apparent from the following description taken in connection with the accompanying drawings, in which:

Figure 1 is an elevational view of a machine tool equipped with a system embodying the features of the invention.

Fig. 2 is an enlarged fragmentary end elevational view of the driving connection for the pump.

Fig. 3 is a sectional view on the line 3—3 of Fig. 2.

Fig. 4 is an enlarged fragmentary plan view of the pump.

Fig. 5 is a sectional view taken on the line 5—5 of Fig. 4.

Fig. 6 is a fragmentary sectional view taken on the line 6—6 of Fig. 4.

The present embodiment of the system is adapted for use with a machine tool such as a band saw, indicated generally at 10, to supply liquid coolant to the cutting tool in its operation upon a piece of work. The system comprises generally a pump and a driving connection therefor which is capable of yielding so that the pump will be operated at a rate varying in proportion to the flow of coolant permitted at the discharge nozzle.

As shown in the drawings, a nozzle 11 controlled by a valve 12 is disposed adjacent the point of application of the saw to the work. Below the band saw is a pan 13, preferably resting on the floor, to catch the coolant as it drains off the saw, and positioned in the pan 13 is a pump, indicated generally at 14, adapted to return the coolant from the pan 13 to the nozzle 11 through a pipe or hose 15. The pump 14 is adapted to be connected to any constantly driven part of the band saw 10, such as the main shaft 16.

The pump 14 is of simple and inexpensive construction, being of the reciprocating type. It comprises, in the present instance, a pair of alined cylinders 20 having a common piston 19. In the preferred form, the cylinder blocks 20 are spaced from each other and are cast integrally with a base 21 at one side thereof. The latter has a plurality of legs 22 adapted to be secured to the pan 13 and to raise the base 21 a short distance above the bottom of the pan 13 to permit coolant to flow under the base. A pocket 23 is formed on the under side of the base, which is covered by a screen 24 to strain foreign matter from the coolant. The pocket 23 is of relatively large area, so that the screen 24 may have a fine mesh and still permit a substantial flow of coolant therethrough. Connecting with the pocket 23 is a pair of inlet passages 24ª, one for each cylinder 20, controlled by ball valves 25.

The outlets for the cylinders 20 comprise passages 26 drilled in the blocks and controlled by ball valves 27. Each ball valve 27 is guided by the walls of an enlarged portion of the passage 26 and a plurality of holes 28 are drilled beside the enlarged portion of the passage 26 and opening thereinto to permit flow of coolant from the cylinder around the ball valve 27 when the passage 26 is opened. The ball valves 27 are retained within the enlarged portions of the passages 26 by studs 29 formed in a cap 30 having a passage connecting the outlet passages 26 of both cylinders with the hose 15.

As above indicated, the connection between the pump 14 and the shaft 16 of the band saw is capable of yielding so that the pump will be operated at a rate varying in proportion to the back pressure set up by the valve 12. This connection preferably includes a yieldable member in the form of a thin, flat bar 31 to which an oscillatory motion is imparted in the rotation of the shaft 16, and made of spring steel so as to be capable of yielding torsionally when applied to the operation of a crank 32 to vary the output of the pump.

In the present embodiment, oscillatory motion is imparted to the yieldable element 31 by means comprising a bushing 40 (see Figs. 1, 2 and 3) mounted on the shaft 16 for rotation therewith and having a wobbler 41 formed with its axis at a small angle to the axis of the shaft 16. Mounted on the wobbler 41 is a bushing 42 which is held against rotation by a fork 43 attached to the upper end of the yieldable member 31 and having a pair of pointed pins 44 pivotally bearing in lugs formed on opposite sides of the bushing 42. Thus, on rotation of the shaft 16, the fork 43 will be oscillated about a vertical axis by the wobbler 41 but may hang vertically downward throughout the entire movement of the wobbler 41 due to the pivotal bearing of the pins 44.

The crank 32 through which the oscillatory motion imparted to the member 31 is transmitted to the pump, comprises, in the present instance, a rod 45 bent at one end for insertion into a hole in the piston 19 midway between the cylinders 20. The rod 45 is secured in a block 46 which is loosely supported on the base 21, opposite the cylinders 20, to permit limited shifting thereof both in a vertical direction and in the plane of the crank during the operation of the crank. To this end, a fixed abutment 47 is formed integrally with the base 21 on one side of the block 46 and an adjustable abutment 48 is secured to the base 21 on the other side of the block 46, as by a screw 49. The abutments 47 and 48 are spaced apart sufficiently to permit the block 46 to rotate and shift freely therebetween. To prevent the block 46 from riding out from between the abutments 47 and 48, a tongue 50 is formed thereon, which extends under the abutment 48 permitting a limited vertical shifting of the block 46.

The yieldable member or bar 31 is secured at its lower end to the block 46 as by a set screw 56, and at its upper end in the fork 43 as by a clamping plate 57. Since the block 46 is supported adjacent the floor and at a substantial distance from the fork 43, the member 31 is capable of yielding when a torsional stress is applied thereto. Thus, the stroke of the piston 19 may be varied while the fork 43 continues to oscillate to its full extent. The use of the member 31 as the connector between the fork and the crank 32 also has the advantage of avoiding the necessity of accurately alining the block 46 with the fork 43, since the crank will be operated by the connecting member even though slightly out of line, the member in such case being slightly sprung.

To keep the block 46 and piston 19 lubricated, should the coolant in the pan 13 become exhausted, a container is placed around the pump and block 46, comprising an upstanding wall 58 formed integrally around the base 21. When the pump operates, a small leakage of coolant from the cylinders 20 will occur around the piston 19. This coolant will collect in the container formed by the base 21 and wall 58 and gradually fill the container with coolant so that it constitutes a bath in which the piston and crank operate. If the coolant in the pan 13 becomes exhausted, that held in the container remains to lubricate the parts.

In operation, assume that the valve 12 is open to permit a free flow of coolant through the nozzle 11. The fork 43 is oscillated by the wobbler 41 on the shaft 16, and the crank 32 and piston are operated through the connecting member 31. When the valve 12 is partially or wholly closed, a pressure is set up in the cylinders of the pump which resists movement of the piston. Such resistance causes a torsional stress on the member 31 causing it to yield in accordance with the resistance to the piston and the opening of the valve 12. Thus, in the operation of the band saw, when it is desired to use coolant in making a cut, the pump is operated at a rate sufficient to produce the flow desired. When no coolant is used, the pump automatically ceases to operate and the oscillatory movement of the fork 43 is absorbed by the yielding of the member 31.

From the above description, it will be apparent that I have provided a drive mechanism for a supply system of the character set forth which is simple and inexpensive to construct, since the yieldable member provides a simple means by which the operation of the pump may be varied. The use of such a connection also has the further advantage of not requiring an accurate positioning of the pump relative to the shaft 16, since any small disalinement therebetween may be taken up by slightly springing the strap. By providing a bath of coolant in which the piston and crank operate, the latter are lubricated even though the coolant in the pan 13 becomes exhausted.

I claim as my invention:

1. In a system of the character set forth, the combination of a constantly rotating shaft, a member mounted on said shaft and adapted to be oscillated thereby, a piston pump, a valve controlling the flow from said pump, a crank for reciprocating said piston, and a connector between said oscillatory member and said crank capable of yielding torsionally when said valve decreases the flow from said pump and resistance is offered to the movement of the piston.

2. In a system of the character set forth, the combination of a constantly driven oscillatory member, a piston pump, a crank for reciprocating said piston, yieldable means connecting said oscillatory member and said crank, and a support for said crank permitting limited shifting thereof both in its plane and along its axis.

3. In a system of the character set forth, the combination of a constantly rotating shaft, oscillatory means supported by said shaft and driven thereby, a piston pump, a crank for reciprocating said piston, and a thin flat bar connecting said oscillatory means and said crank and made of resilient material capable of yielding torsionally to absorb the oscillating motion when resistance is offered to movement of said piston.

4. In a system of the character set forth, the combination of a constantly driven shaft, a reciprocating piston pump, a crank having its free end secured to said piston, and means for oscillating said crank comprising a wobbler on said shaft, a bushing mounted on said wobbler, a fork having its arms pivoted to said bushing, and a yieldable connection between said fork and said crank.

5. In a system of the character set forth, the combination of a constantly driven shaft, a reciprocating piston pump, a crank for reciprocating said piston, and means for oscillating said crank comprising a wobbler on said shaft, a bushing surrounding said wobbler, a fork extending perpendicularly to said shaft and having its arms pivoted to said bushing on an axis intersecting the axis of the shaft, and a yieldable connector attached at one end to said fork and at its other end to said crank at the axis thereof.

6. In a system of the character set forth, the combination of a constantly driven oscillatory member, a pump having a piston, a crank for reciprocating said piston, yieldable means connecting said oscillatory member and said crank and extending perpendicularly to the plane of said crank, and a support for said crank permitting limited shifting thereof in its plane to permit the free end of said crank to follow the path of said piston.

7. In a system of the character set forth, the combination of a rotary drive shaft, a reciprocatory driven member, a torsionally yieldable element having a driving connection at one end with said member, and means for converting the rotary movement of said shaft into oscillatory movement at the other end of said element.

8. In a system of the character set forth, the combination of a rotary drive shaft, means for converting the rotary movement of said shaft to oscillatory movement, a driven reciprocatory member, and a torsionally yieldable element connected to said means and said member, said element comprising a thin flat bar made of resilient material.

9. In a system of the character set forth, the combination of a rotary drive shaft, means for converting the rotary movement of said shaft to oscillatory movement, a reciprocatory member, oscillatory means for driving said member, and a torsionally yieldable element connecting said two means.

10. In a system of the character set forth, the combination of a rotary drive shaft, means for converting the rotary movement thereof to oscillatory movement, a reciprocatory pump, a valve controlling the flow from said pump, and a connector between said means and said pump capable of yielding torsionally when said valve decreases the flow from said pump.

GEORGE J. BLUM.